Nov. 6, 1928.

O. MALCHER 1,690,123

WEIGHING SCALE

Filed Feb. 2, 1924

Nov. 6, 1928. 1,690,123
O. MALCHER
WEIGHING SCALE
Filed Feb. 2, 1924 4 Sheets-Sheet 3
Fig.3
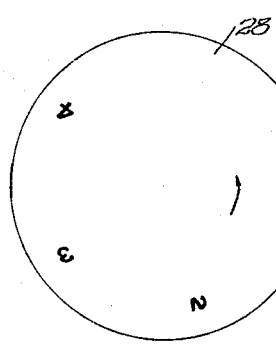
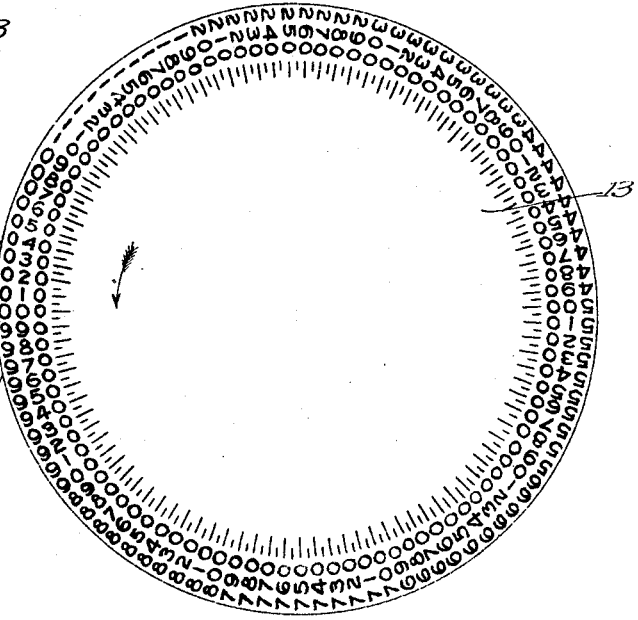
Fig.4
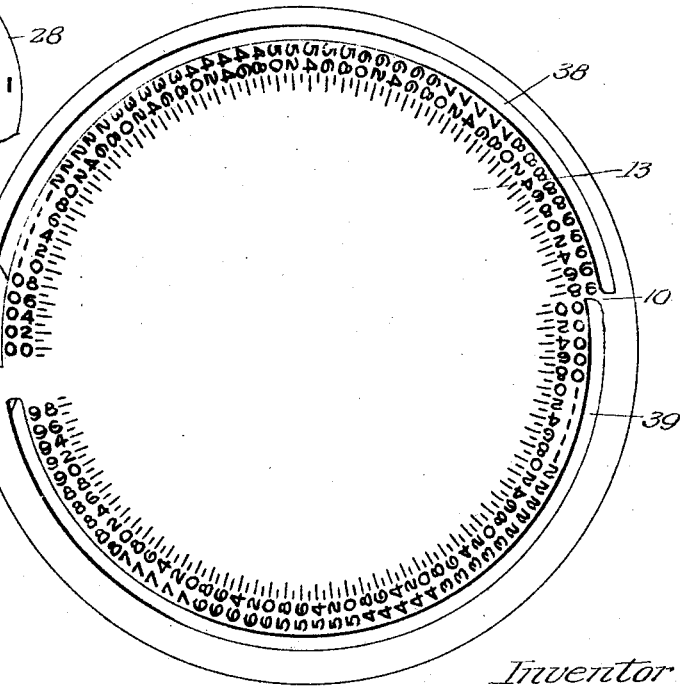
Inventor
Otto Malcher
By Nissen & Crane
Attys.

Nov. 6, 1928.   1,690,123
O. MALCHER
WEIGHING SCALE
Filed Feb. 2, 1924   4 Sheets-Sheet 4
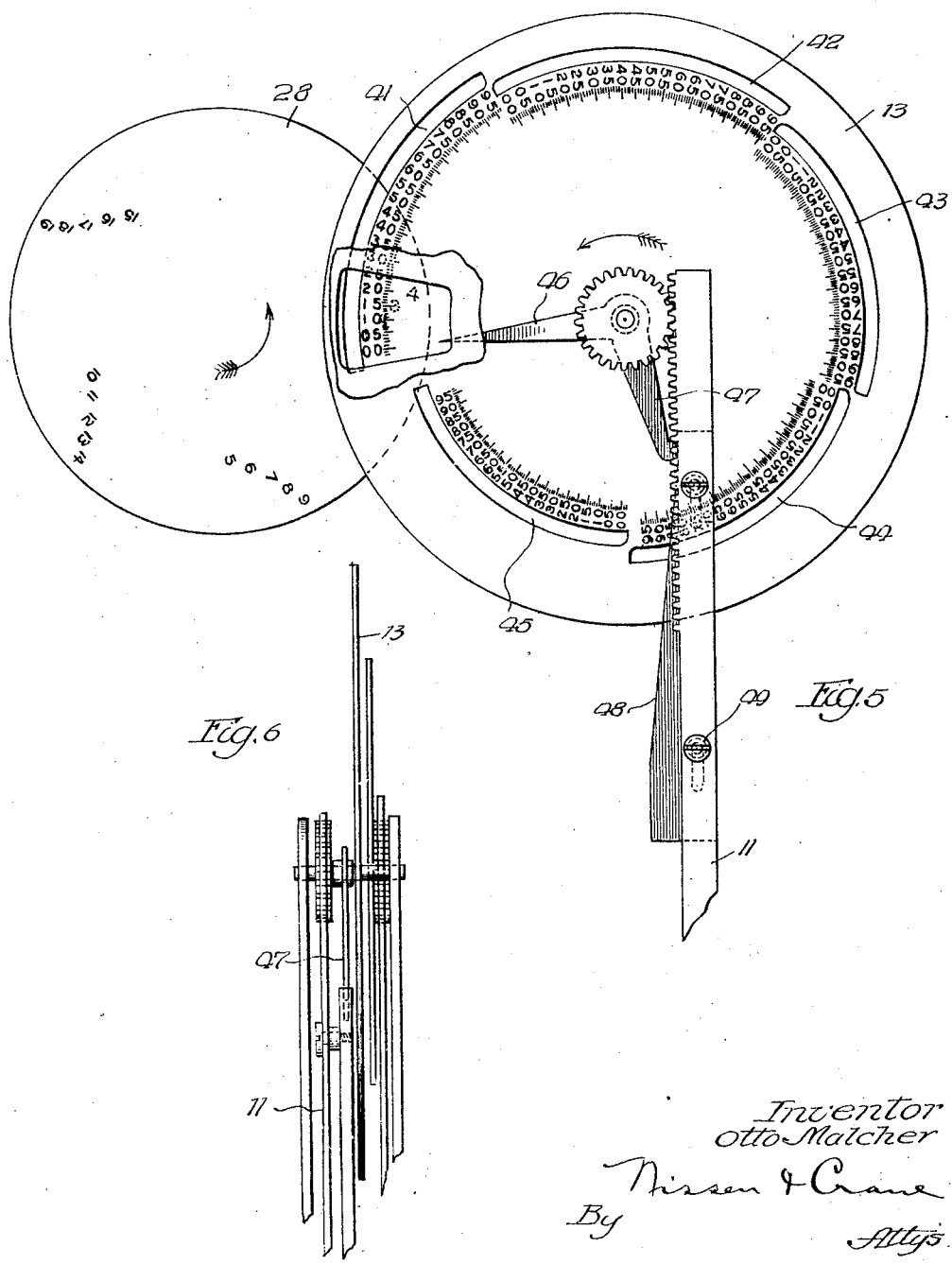

Patented Nov. 6, 1928.

1,690,123

UNITED STATES PATENT OFFICE.

OTTO MALCHER, OF CHICAGO, ILLINOIS.

WEIGHING SCALE.

Application filed February 2, 1924. Serial No. 690,134.

This invention relates to weighing scales of the type in which drop weights are used for increasing the capacity of the scale beyond that covered by range of movement of the indicator, and has for one of its objects the provision of means for exhibiting the weights directly irrespective of the number of drop weights deposited.

A further object is the provision of indicating means which shall be easy to read without chance of error.

A further object is to provide a scale of the class described which shall be of improved construction and operation.

The invention is exemplified in the combination and arrangement of parts shown in the accompanying drawings and described in the following specification, and it is more particularly pointed out in the appended claims.

In the drawings—

Fig. 3 is a diagrammatic view showing a dial arrangement for a scale in which the dial has a capacity of 1000 pounds and drop weights are employed for increasing the capacity by units of 1000 pounds;

Fig. 4 is a diagrammatic view showing a dial arrangement for a scale in which the dial has a range of 200 pounds;

Fig. 5 shows an arrangement in which the dial has a range of 500 pounds; and

Fig. 6 is a fragmentary elevation, with parts in section, looking from the right in Fig. 5.

Figure 1:
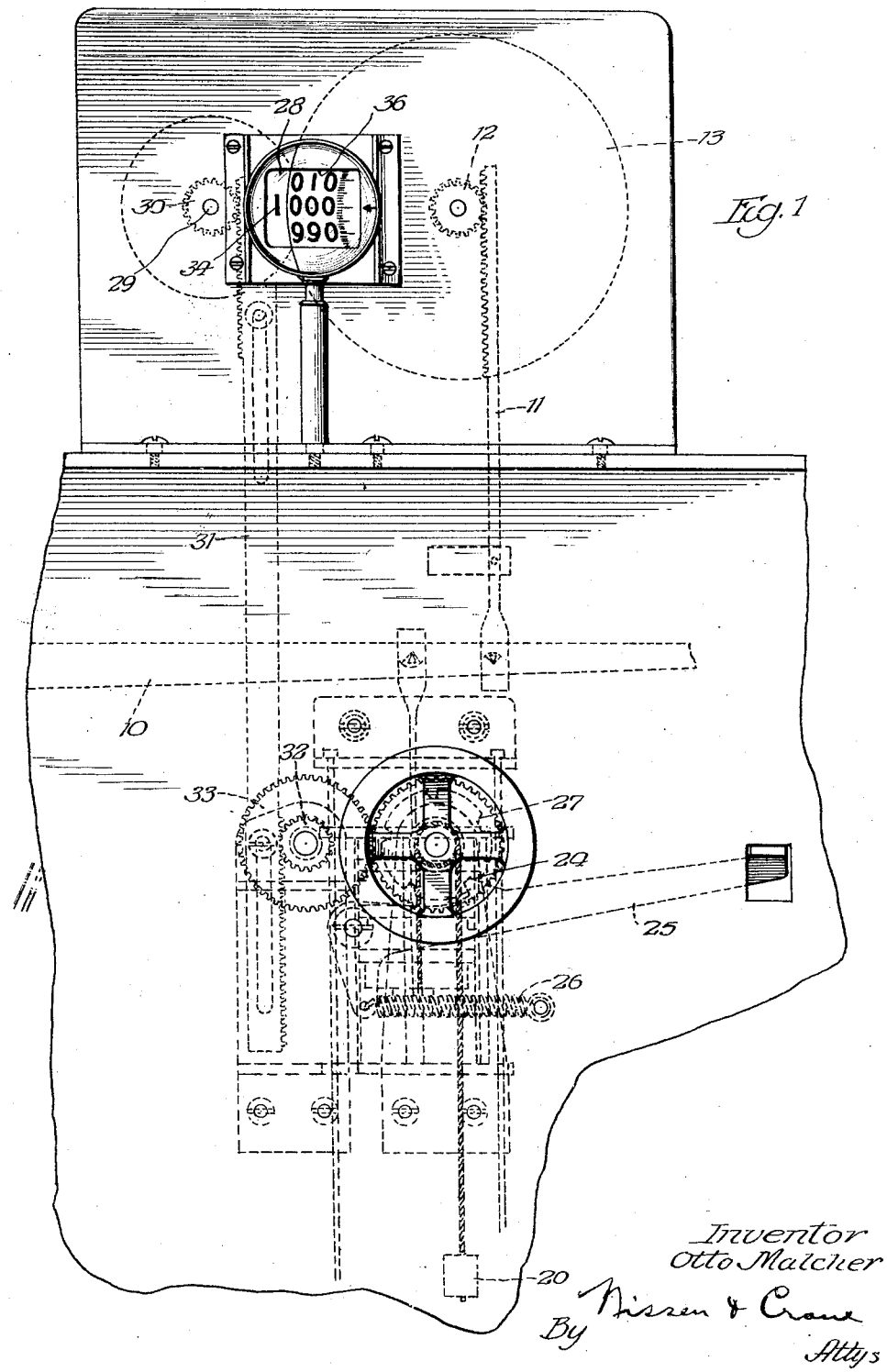
Fig. 1 is a front elevation showing a portion of a weighing scale with one embodiment of the present invention applied thereto.
Figure 2:
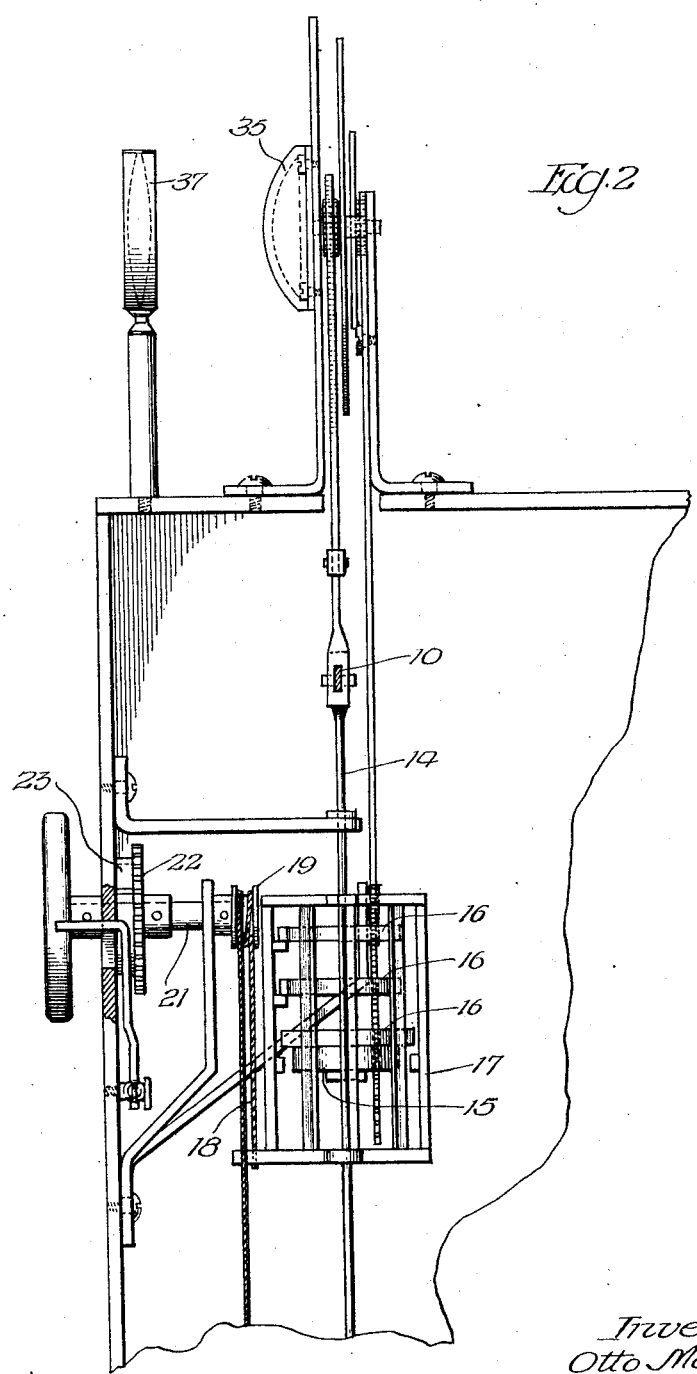
Fig. 2 is a fragmentary elevation with parts in section looking from the right in Fig. 1.

Referring first to Figs. 1 and 2, the numeral 10 designates a scale beam having a rack 11 connected therewith and meshing with a pinion 12 which operates a disc 13 in a manner well known in the art. The scale beam 10 has a counterpoise 14 suspended therefrom provided at its lower end with a disc 15 for receiving a series of weights 16. The weights 16 are suspended in a cage 17 which is supported by a cable 18 mounted upon a pulley 19 and provided with a counterweight 20. The pulley 19 is secured to a shaft 21 having a gear wheel 22 and a ratchet wheel 23 attached thereto. The ratchet wheel 23 is held by a tooth 24 on a lever 25, the lever being provided with a spring 26 for holding the tooth in engagement with the notches 27 in the ratchet wheel.

When it is desired to deposit a weight upon the disc 15 the lever 25 is depressed to permit rotation of the ratchet wheel 23 an amount corresponding to the distance between the notches 27. This will lower the cage 17 a sufficient amount to transfer one of the weights 16 to the disc 15. Each of the weights 16 corresponds to the weight represented by a complete revolution of the dial 13. Thus if the dial 13 registers 1000 pounds for a complete revolution, each of the weights 16 will counterbalance a weight of 1000 pounds on the scale platform, so that if the weight on the platform exceeds 1000 pounds a sufficient number of counterweights 16 are deposited on the disc 15 to counterbalance the even multiples of 1000 pounds, and the excess over the amount counterbalanced by the weights 16 will be indicated by the dial 13. It will be apparent therefore that in order to indicate the correct weight it will be necessary to prefix to the indication on the dial 13 the number corresponding to the number of counterweights deposited. This operation is effected by means of a disc 28 journaled at 29 and having a pinion 30 secured thereto. The pinion 30 meshes with a rack 31 which in turn meshes with a pinion 32 secured to a gear 33 which meshes with the gear 22 on the shaft 21. A series of numerals 34 is spaced about the disc 28 in position to be brought adjacent the periphery of the disc 13 at the reading line.

When the cage 17 is in its upper position the portion of the disc 28 opposite the reading line will be blank. When a single weight has been deposited the disc 28 will be rotated a sufficient amount to bring the numeral 1 opposite the reading line. It will thus be seen that the numeral 1 will be prefixed to the indications on the dial 13 when a single weight is deposited. This is the condition represented in Fig. 1 of the drawings. When a second weight has been deposited the disc 28 will be rotated to bring the numeral 2 opposite the reading line. In like manner a different numeral will be brought into reading position after the deposit of each weight.

In order to facilitate reading the indications, a lens 35 is placed in front of the opening 36 through which the readings are visible. The lens 35 preferably has a flat face adjacent the opening 36 and has a cylindrical convex face directed away from the opening. This form of lens increases the height of the numerals and magnifies the spaces between the indicating lines on the dial 13. To further magnify the readings, a lens 37 is positioned in front of the lens 35 and spaced slightly therefrom. The lens 37 is preferably a double convex lens having spherical surfaces. This combination of lenses makes it possible to distinctly see the readings in magnified proportions and greatly facilitates the accuracy and ease with which the readings are taken.

Fig. 3 shows the arrangement of the numerals on the two dials 13 and 28 for indicating readings from zero to 1000 pounds. This is the arrangement described in connection with Figs. 1 and 2.

Fig. 4 shows the dial arrangement for a scale in which the capacity of the indicator is 200 pounds and the drop weights increase the capacity by units of 200 pounds. In this arrangement there are two sets of readings on the dial 13 each ranging from zero to 100. Adjacent the sets of readings there are arcuate slots 38 and 39, respectively. The inner edge of one of these slots is the same distance from the center of the disc as the outer edge of the other slot and one end of the slot 38 registers angularly with the adjacent end of the slot 39. The slots are beveled slightly at their corners to provide a supporting connection 40 for the portion of the disc outside the slots. A greater space may be left between the opposite ends of the slots and the scale so proportioned that the disc will make slightly more than a complete revolution for a 200 pound weight. In this case the disc 28 is provided with figures arranged in different radial zones, the figures being disposed in pairs slightly offset angularly relative to one another.

At the position opposite the reading line the single numeral 1 will be positioned in the outer radial zone and it will be apparent that this numeral will be hidden when the disc 13 is in its zero position and will remain hidden for the first 100 pound movement of the disc, the disc 13 traveling in a counterclockwise direction. As soon as the 100 pound position has passed the reading point the slot 39 will register with the numeral 1 on the disc 28 so that during the second 100 pound movement the numeral 1 will be prefixed to the numbers adjacent the slot 39, thus indicating 100 pounds, plus the reading adjacent the slot 39. In this way the scale will indicate correctly up to 200 pounds.

If a weight greater than 200 pounds is placed upon the scale pan a counterweight 16 will be deposited upon the scale beam which will rotate the disc 28 to bring the disc 28 into its second position. In this position the numerals 2 and 3 will be adjacent the reading point and the numeral 2 will be exposed through the slot 38 for movement of the scale up to 300 pounds when the numeral 3 will appear through the slot 39. It will be noted that the numerals 2 and 3 are slightly offset angularly relative to one another so that for points approximating the 300 pound limit there will be a slight space in which one reading will appear having 2 as a prefix and a different reading will appear having 3 as a prefix, the reading line, however, will indicate which of these readings indicates the weight of the article on the platform. Other pairs of numerals for greater weights are provided corresponding to the different counterpoises 16.

Figs. 5 and 6 indicate an arrangement of parts for a disc capacity of 500 pounds. In this arrangement the dial 13 is provided with a series of radially offset slots 41, 42, 43, 44 and 45. The disc 28 has sets of numerals disposed thereon similar to those in Fig. 4, but in this case each set comprises five numerals, each numeral being offset radially and angularly relative to the others, as shown in Fig. 5. The disc 28 is rotated in the manner already described to bring the different sets of numerals adjacent the reading point for the different counterweights as they are deposited. For weights from zero to 500 pounds the numerals on the disc 28 will be from zero to 4, but the zero numeral may be omitted as it is meaningless. For the first 100 pounds there will be no number prefixed to the readings on the dial 13. After the 100 pound mark is passed the numeral 1 will be disclosed through the slot 42, and after the 200 pound position is passed the numeral 2 will be disclosed through the slot 43, and so on up to the capacity of the scale.

Since the numerals of each set are offset angularly relative to one another it will be apparent that the position of the prefixed numbers will change relative to the reading line as the dial rotates from one position to another. To correct this difficulty provision is made for shifting the reading point. To do this a reading line indicator 46 is pivoted on the axis of the scale dial 13 and is provided with a downwardly extending arm 47 which bears against a cam face 48 secured to the rack 11. The cam face 48 may be held adjustably to the rack by means of pin and slot connections 49 to provide for proper adjustment of the reading line. It will thus be seen that as the dial 13 rotates the indicator 46 will be moved about its pivot so that it will always designate a reading line in registration with the particular one of the prefixed numbers exposed by the slots in the dial. The cam face 48 should be properly laid out to produce uniform movement of the indicator 46 for a given angular movement of the dial and since the angular relation of the arm 47 changes slightly relative to the cam face 48 it will be apparent that the face 48 will not be exactly a straight line, although it will very closely approach a straight line since the reading line is varied uniformly relative to the rotation of the disc. The calibrations on the disc will be made with reference to the reading line indicator 46 and not to a fixed point, but since both members are controlled by the same rack the correction for the shifting reading line is merely a matter of calibration.

I claim:—

1. A weighing scale comprising a rotary disc having numerals on a flat face thereof for indicating weights, a second rotary disc arranged adjacent said first disc and having numerals on a flat face thereof to be read in conjunction with the numerals on said first disc and weight controlled means for rotating said first mentioned disk.

2. A weighing scale comprising a rotary disc having numerals disposed about the periphery thereof on one of its flat faces, means for increasing the capacity of said scale beyond the amount indicated by the numerals on said disc, a second disc having numerals thereon arranged to be disposed in prefixed relation to the numerals on said first disc, and means for operating said second disc from the capacity increasing means.

3. In a weighing scale, the combination with a weight controlled movable member, of a dial having a range corresponding to the range of movement of said member, means for depositing counterweights on said member to increase the capacity of said scale, a second dial controlled by said weight depositing means arranged adjacent said first dial and having numerals thereon, and means connecting said second dial with said weight depositing means for operating said dial to bring different numerals in prefixed relation to the numerals on said first dial to produce a total reading corresponding to the weight represented by the counterweights deposited, plus the weight represented by the weight of said movable member and means for retaining said second dial stationary while said first dial is moved by said weight controlled member.

4. In a weighing scale, a movable dial having numerals thereon, said dial having an opening therein to disclose other numerals in prefixed relation to the numerals on said dial and means for supporting a numeral in registration with said opening while said dial moves.

5. In a weighing scale a dial having circumferentially arranged graduations thereon and having an arcuate slot therethrough in juxtaposition to said graduations to disclose characters to be read in conjunction with said graduations and means for presenting characters in position to be disclosed through said slot and when so disclosed to constitute one decimal order of a complete number, the other decimal orders of which comprise numbers on said dial.

6. In a weighing scale, a dial having circumferentially arranged numerals thereon and having an arcuate slot therein arranged adjacent said numerals in the position of the next higher decimal order above the highest order of said numerals, and a second dial having numerals thereon arranged to register with said slot.

7. A weighing scale comprising a dial having circumferentially arranged numerals thereon and having an arcuate slot therein disposed adjacent said numerals, a weight controlled member for operating said dial, a second dial having numerals thereon arranged to register with the slot in said first dial, and counterweight depositing mechanism for operating said second dial to bring different numerals into registration with said slot.

8. In a weighing scale, a dial having a plurality of sets of numerals thereon, said dial having arcuate slots therein adjacent said sets of numerals and in the position of the next higher decimal above the highest order of said numerals, said slots being arranged in offset relation relative to one another.

9. A weighing scale comprising a dial having a plurality of sets of peripherally arranged numerals thereon, said dial having slots therein adjacent said sets of numerals, the slot adjacent each set being in the position of one decimal order of the numerals of that set and adjacent ends of said slots being arranged in angular registration with one another and offset radially relative to one another.

10. A scale dial having a plurality of sets of peripherally arranged graduations thereon, arcuate slots adjacent said graduations, said slots having adjacent ends thereof arranged in registration with a common radius of said dial and offset radially relative to one another, there being a connecting portion of said dial interposed between the adjacent ends of said slots.

11. In a weighing scale, a dial having circumferentially arranged numerals thereon, a second dial arranged adjacent said first dial but eccentrically thereof and having numerals thereon arranged to be read in decimal order with the numerals on said first dial, said first dial having a portion thereof cut away to permit the characters on said second dial to be seen.

12. A weighing scale comprising a dial having arcuately arranged numerals thereon, a second dial disposed adjacent said first dial and having numerals thereon arranged in pairs offset relative to one another, said first dial having offset cut-away portions to selectively expose the numerals on said second dial in decimal order with respect to different numerals on said first dial.

13. In a weighing scale, a dial having a plurality of sets of circumferentially arranged numerals thereon, a weight controlled member for operating said dial, said dial having offset cut-away portions adjacent said sets of graduations, a second dial having a plurality of sets of characters thereon, means for increasing the capacity of said scale beyond the capacity of said first-mentioned dial, and means controlled by said capacity increasing means for rotating said second dial to bring different characters into registration with said cut-away portions to permit said characters to be read in conjunction with the characters on said first-mentioned dial.

14. In a weighing scale, a graduated member, a reading line indicator, and weight controlled means for shifting said reading line indicator and graduated member in the same direction.

15. A weighing scale comprising a rotary dial, a weight controlled member, a reading line indicator, and means connecting said weight controlled member to said dial and indicator to shift said dial and indicator amounts proportional to the movement of said weight controlled member.

16. In a weighing scale, a dial having a plurality of sets of graduations thereon, a second dial having offset characters to be read in conjunction with the graduations on said first dial, and a movable reading line indicator for indicating the reading line of said dials.

17. In a weighing scale, a dial having a plurality of graduations thereon, said dial having offset cut-away portions adjacent said graduations, a second dial having offset characters thereon, means for moving said second dial to bring the characters thereon into registration with the cut-away portions of said first dial, a reading line indicator for said dials, and weight controlled means for moving said first-mentioned dial and reading line indicator.

18. A weighing scale comprising a rotary dial having a plurality of sets of numerals thereon, said dial having offset slots therein registering with the different sets of numerals, a second dial having different sets of offset characters thereon, drop weight mechanism for rotating said second dial to bring the various sets of numerals into reading position, a reading line indicator for said dials, and weight controlled means for moving said first-mentioned dial and reading line indicator.

19. A weighing scale comprising a pair of dials arranged adjacent one another, means for moving said dials to bring characters thereon into position to be read in conjunction with one another, a lens having a cylindrical face disposed adjacent the reading point for said dials, and a double convex lens positioned in front of said first-mentioned lens.

20. In a weighing scale, an indicator comprising a pair of dials having numerals thereon, weight actuated means for moving said dials to bring characters thereon into juxtaposition at a reading point, and a pair of lenses supported in spaced relation adjacent said reading point.

21. In a weighing scale, an indicator comprising a pair of dials having characters thereon, means for actuating said dials to bring said characters into position to produce different combinations at a fixed reading point, and a pair of spaced lenses for viewing the characters at said reading point, one of said lenses having a cylindrical face and the other of said lenses having a spherical face.

22. In a weighing scale, an indicator comprising a pair of movable dials having characters thereon, means for moving said dials to bring different characters into juxtaposition at a common reading point, a lens having a convex cylindrical surface fixed adjacent said reading point, and a convex spherical lens positioned in front of said cylindrical lens and spaced therefrom.

23. In a weighing scale, a pair of dials, one of said dials having an arcuate slot therein and the other of said dials having numerals thereon in position to be disclosed through said slot, and means for separately rotating said dials.

24. In a weighing scale, a pair of dials, one of said dials having an arcuate slot therein and having numbers adjacent said slot while the other of said dials has numbers thereon arranged to appear through said slot in prefixed relation to the numbers on said first-mentioned dial, and weight controlled means for rotating said first-mentioned dial.

25. In a weighing scale, a pair of dials, one of said dials having an arcuate slot therein and having numbers thereon adjacent said slot while the other of said dials has numbers thereon arranged to appear through said slot in prefixed relation to the numbers on said first-mentioned dial, weight controlled means for rotating said first-mentioned dial, and hand controlled means for rotating said second-mentioned dial.

26. The combination with a weighing scale having a weight controlled member and hand controlled means for increasing the capacity of said scale above that of said weight controlled member, of a pair of dials, one of said dials having an arcuate slot therein and numbers adjacent thereto while the other of said dials has numbers thereon arranged to appear through said slot in prefixed relation to the numbers on said first-mentioned dial, said first-mentioned dial being rotated by said weight controlled means while said second-mentioned dial is rotated by said hand controlled means.

27. The combination with a weighing scale having characters thereon for indicating weight, of a lens having a cylindrical face positioned adjacent to said characters and a second lens having a spherical surface spaced away from said first lens and providing means for magnifying said characters as viewed through said lenses.

28. The combination with a weighing scale having a reading line thereon, of a lens having a cylindrical face curved about a horizontal axis and placed adjacent said reading line, and a second lens having a spherical convex face, said second lens being arranged in front of said first named lens and in position to cooperate therewith, for magnifying the characters displayed at said reading line.

In testimony whereof I have signed my name to this specification on this 30th day of January, A. D. 1924.

OTTO MALCHER.